(12) United States Patent
Yin et al.

(10) Patent No.: US 11,379,534 B2
(45) Date of Patent: Jul. 5, 2022

(54) DOCUMENT FEATURE REPOSITORY MANAGEMENT

(71) Applicant: International Business Machines Corporation, Armonk, NY (US)

(72) Inventors: Kun Yan Yin, Ningbo (CN); Qi Y Wang, Ningbo (CN); Wen Wang, Beijing (CN); Hai Ji, Beijing (CN); Rui W W Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 16/687,848

(22) Filed: Nov. 19, 2019

(65) Prior Publication Data

US 2021/0149962 A1 May 20, 2021

(51) Int. Cl.
| | | |
|---|---|---|
| *G06K 9/54* | (2006.01) | |
| *G06F 16/9038* | (2019.01) | |
| *G06F 16/9035* | (2019.01) | |
| *G06F 16/583* | (2019.01) | |
| *G06F 16/93* | (2019.01) | |
| *G06V 10/46* | (2022.01) | |

(Continued)

(52) U.S. Cl.
CPC ...... *G06F 16/9038* (2019.01); *G06F 16/5846* (2019.01); *G06F 16/9035* (2019.01); *G06F 16/93* (2019.01); *G06V 10/462* (2022.01); *G06V 30/153* (2022.01); *G06V 30/414* (2022.01); *G06V 30/418* (2022.01)

(58) Field of Classification Search
CPC .. G06F 16/9038; G06F 16/93; G06F 16/9035; G06F 16/5846; G06F 16/532; G06F 16/56; G06F 16/51; G06K 9/00463; G06K 9/00483; G06K 9/344; G06K 9/4671

See application file for complete search history.

(56) References Cited

U.S. PATENT DOCUMENTS

| | | | | |
|---|---|---|---|---|
| 8,782,077 B1 * | 7/2014 | Rowley | ................. | G06F 16/951 707/769 |
| 8,798,402 B2 * | 8/2014 | Hill | ........................ | G06V 20/42 382/218 |

(Continued)

FOREIGN PATENT DOCUMENTS

| | | |
|---|---|---|
| CN | 102012934 A | 4/2011 |
| CN | 105426884 A | 3/2016 |
| CN | 108694393 A | 10/2018 |

OTHER PUBLICATIONS

Doermann, David. "The indexing and retrieval of document images: A survey." Computer Vision and Image Understanding 70.3 (1998): 287-298. (Year: 1998).*

(Continued)

*Primary Examiner* — Avinash Yentrapati
(74) *Attorney, Agent, or Firm* — Grant M. McNeilly (57) ABSTRACT

A plurality of documents is received. From one or more documents within the plurality, a set of image features is extracted. A document feature repository is generated by storing one or more sets of image features, by document. A document search query is received. The document search query is pre-processed to generate a set of variable document search queries. The document feature repository is searched using the set of variable document search queries. The search results are presented to a user.

20 Claims, 7 Drawing Sheets

(51) Int. Cl.
  *G06V 30/148* (2022.01)
  *G06V 30/414* (2022.01)
  *G06V 30/418* (2022.01)

(56) References Cited

U.S. PATENT DOCUMENTS

| | | | |
|---|---|---|---|
| 9,055,384 B2 | 6/2015 | Ivanchenko et al. | |
| 9,323,784 B2 | 4/2016 | King et al. | |
| 9,412,052 B1 | 8/2016 | Natarajan et al. | |
| 10,311,114 B2* | 6/2019 | Griddaluru | G06F 16/338 |
| 2006/0085399 A1* | 4/2006 | Carmel | G06F 16/951 |
| 2006/0282760 A1* | 12/2006 | Tanaka | G06V 30/416 |
| | | | 707/999.1 |
| 2007/0160295 A1 | 7/2007 | Wang et al. | |
| 2007/0282811 A1* | 12/2007 | Musgrove | G06F 16/3338 |
| 2008/0055669 A1* | 3/2008 | Nagarajan | G06V 30/412 |
| | | | 358/462 |
| 2008/0101726 A1* | 5/2008 | Myers | G06V 30/1478 |
| | | | 382/289 |
| 2011/0153653 A1* | 6/2011 | King | G06F 16/5846 |
| | | | 707/769 |
| 2012/0005225 A1* | 1/2012 | Chidlovskii | G06F 16/3323 |
| | | | 707/769 |
| 2013/0170749 A1* | 7/2013 | Tian | G06V 30/413 |
| | | | 382/218 |
| 2013/0212090 A1* | 8/2013 | Sperling | G06F 16/9535 |
| | | | 707/723 |
| 2014/0187223 A1* | 7/2014 | Ivanchenko | G06V 20/63 |
| | | | 455/418 |
| 2015/0205866 A1* | 7/2015 | Shaw | G06F 16/951 |
| | | | 707/E17.084 |
| 2019/0065579 A1* | 2/2019 | Daher | G06F 16/93 |
| 2020/0175061 A1* | 6/2020 | Penta | G06F 16/532 |

OTHER PUBLICATIONS

Saha, "Using computer vision to extract text more accurately from images", External Document © 2019 EdgeVerve Systems Limited, White Paper, 5 pages. https://www.edgeverve.com/wp-content/uploads/2019/03/XtractTextWithVision.pdf.

Chiatti et al., "Text Extraction and Retrieval from Smartphone Screenshots: Building a Repository for Life in Media", Information Sciences and Technology, Pennsylvania State University, Jan. 2018, 9 pages. https://arxiv.org/pdf/1801.01316.pdf.

* cited by examiner

DOCUMENT FEATURE REPOSITORY MANAGEMENT

BACKGROUND

The present disclosure relates generally to the field of document management, and more particularly to document feature repository management.

Document imaging, whether by portable scanner, smart phone snapshot, or by other means, is becoming more and more common. Documents may contain images or be written in character-based languages. Documents may contain stamps or seals to convey authenticity or authority. The use of Optical Character Recognition (OCR) to convert document images into text-based document files is not uncommon.

SUMMARY

Embodiments of the present disclosure include a method, computer program product, and system for generating and searching a document feature repository.

A plurality of documents is received. From one or more documents within the plurality, a set of image features is extracted. A document feature repository is generated by storing one or more sets of image features, by document. A document search query is received. The document search query is pre-processed to generate a set of variable document search queries. The document feature repository is searched using the set of variable document search queries. The search results are presented to a user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of document management, and more particularly to document feature repository management. While the present disclosure is not necessarily limited to such applications, various aspects of the disclosure may be appreciated through a discussion of various examples using this context.

As imaging technology develops (e.g., portable scanners, smart phones with cameras, etc.), more and more documents are scanned, imaged, photographed, etc. These documents may contain images themselves (e.g., pie charts, photographs, character-based letters, etc.). Documents with several images and/or large images may be challenging for conventional Natural Language Processing (NLP) and/or Optical Character Recognition (OCR) techniques. NLP may have difficulty, for example, when attempting to "read" images within a document that contain pertinent text, when attempting to confirm/verify the product of a document converter, or when supporting a document search or the selection of text within a document (e.g., for copying/pasting).

Traditional techniques for enhancing the operations of such NLP techniques rely on OCR document searching. For example, when NLP encounters a document with an embedded image containing text, OCR may be employed to recognize the characters within the embedded image. OCR may encounter issues if the embedded image contains color or colored text, or if the scan or snapshot of the document is rotated/misaligned (e.g., the document may have been rotated, curled, bent, creased, wrinkled, crumpled, torn, etc.) to such a degree that OCR does not recognize, or mis-recognizes, the characters.

Disclosed herein are embodiments for generating and searching a document feature repository that can be used to accurately and efficiently search documents, including documents with colored text, rotated characters, etc. The document feature repository may be generated by scanning/imaging documents to generate page images. In embodiments, page images may be imaged into the same format, or they may be imaged using different formats (e.g., .jpeg vs. .tiff vs. .png, etc.). In some embodiments, page images may be converted into a uniform image format. Page images containing color may be binarized to create a grayscale image. The grayscale image may be processed using morphological dilations to bridge any gaps in the text or any images within the grayscale image of the page/document and to create connected blocks of characters within the page image. These character blocks may include paragraphs, sentences, words, individual characters, etc.

In embodiments, features may be extracted from the page images using the Scale-Invariate Feature Transform (SIFT) algorithm. This may include extracting sets of features from character blocks at any level (e.g., paragraph feature(s), sentence feature(s), word feature(s), character feature(s), etc.). In embodiments, extracted features may be represented as block vectors. The extracted features may be stored in a document feature repository, and the extracted features may be associated with the character block, page image, and/or document from which they were extracted. The associations may be embodied in a table, relational database, triplestore, text index, or any other suitable database scheme.

To search the document feature repository, a query (e.g., search criteria) may be submitted to find a matching document. In embodiments, the query process may be enhanced by pre-processing the query to generate a set of variable document search queries. A variable document search query may be similar, but not identical, to the original query. A variable document search query may be generated with a query variation generator. For example, a query may be parsed into subcomponents (e.g., subject, verb, direct object, indirect object, adjective, adverb, particle, prepositional phrase, etc.), and one or more subcomponents may be exchanged for a subcomponent of similar subject matter. For example, a search query containing the words "blue bee" may have either subcomponent exchanged for a word of similar meaning, for a homonym, synonym, or the like. For example, "blue bee" may become "indigo bee," "blue be," "blue honeybee," etc. In embodiments, a plurality of sentence/query variations may be generated, resulting in a plurality of variable document search queries.

In some embodiments, the query pre-process may be further enhanced by converting one or more of the plurality of variable document search queries into an image format. In some embodiments, this image format may be the same image format as the page images. In some embodiments, the text-to-image process may be achieved using, for example, Python (e.g., PIL.Image, PIL.ImageDraw, PIL.ImageFont). In some embodiments, the images of the variable document search queries may include images of characters, images of words, and/or images of sentences. At times, images of the variable document search queries may, for example, provide a more accurate search result (e.g., as opposed to a text-based query when text generated from OCR techniques includes misspellings).

In some embodiments, once the query has been pre-processed, a search of the document feature repository may be performed. An enhancement of the search process may include matching the variable document search queries to image features or matching to character block features associated with the imaged documents. In some embodiments, Fast Library for Approximate Nearest Neighbors (FLANN) techniques may be employed to generate weighted match scores between a variable document search query and the character block features. In some embodiments, this may result in a set or series of weighted match scores, as there may be, for the same document, character block features at the character level, word level, sentence level, paragraph level, etc. In some embodiments, the weights may be pre-determined, set by a user, or they may be set according to the original query. For example, if the original query included a single word, the greatest weight may be given to the weighted match score associated with the word-level character block feature. If the original query included a sentence or a given number of words (e.g., the query exceeds a wordcount threshold), the greatest weight may be given to the weighted match score associated with the sentence-level character block feature.

In some embodiments, the set of weighted match scores for a single page image/document may be combined into a composite match score representing an overall degree, or rank, of a document's match to a given query. In some embodiments, multiple documents may be returned and ranked according to how well they match a given query. In some embodiments, the set of weighted match scores for every variable document search query, as well as the original query, may be further combined into a super-composite match score.

Figure 1:
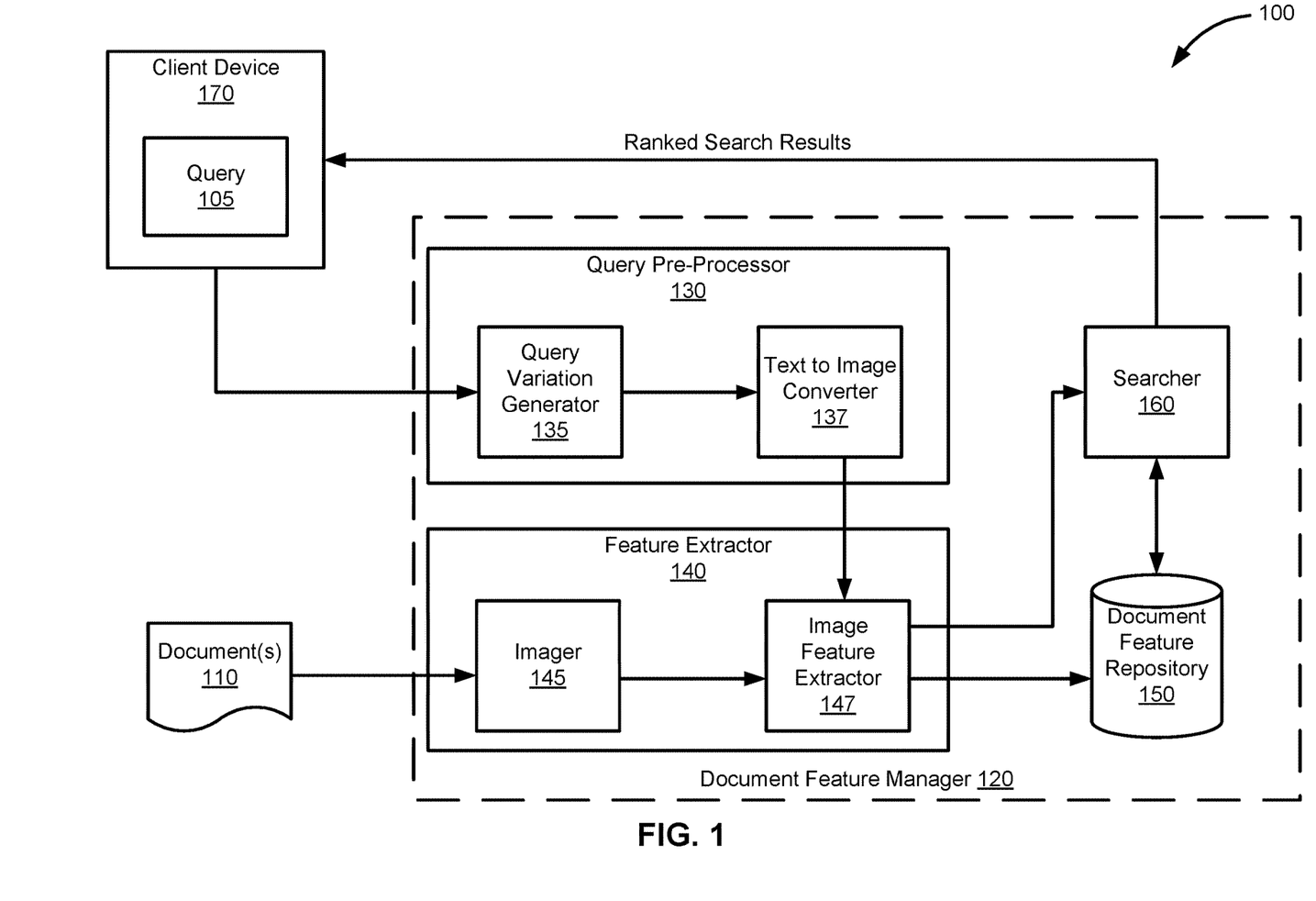
FIG. 1 illustrates an example computing environment, in accordance with embodiments of the present disclosure.

Referring now to FIG. 1, illustrated is an example computing environment 100, in accordance with embodiments of the present disclosure. Example computing environment 100 may include, for example, client device 170, document feature manager 120, and document(s) 110. In some embodiments, example computing environment may include a network (not pictured) which communicatively couples two or more components and/or devices.

Client device 170 may be a computing system, physical or virtual, through which a user may interact with the document feature manager 120 to provide a query 105. In some embodiments, client device may also be used to submit document(s) 110. Client device 170 may be embodied by a desktop computer, a laptop, smart phone, tablet, or any other device, virtualized device, and/or program capable of submitting query 105 and/or document(s) 110 to the document feature manager 120.

Query 105 may be a search string generated by a user to allow the user to search document feature repository 150. Query 105 may include single characters, words, sentences, paragraphs, etc. Query 105 may be in any written/spoken language.

Document(s) 110 may be physical documents or digital documents in any suitable file format. Document(s) 110 may include any number of embedded images, including zero. Embedded images may, or may not, contain representations of textual characters.

Document feature manager 120 may include query pre-processor 130, feature extractor 140, document feature repository 150, and searcher 160. In some embodiments, document feature manager 120 and its sub-components may be physical components or virtualized components, and these sub-components may be stored/located locally on a single computing system, or they may be stored/located remotely from each other and communicatively coupled in a cloud computing environment or other scheme of networked computing devices (e.g., over the Internet, an intranet, etc.). In some embodiments, document feature manager 120, or one or more of its subcomponents, may be stored/located on client device 170.

In some embodiments, feature extractor 140 may include imager 145 and image feature extractor 147. Imager 145 may generate page images from documents(s) 110. In embodiments where document(s) 110 is/are physical, imager 145 may take a photograph or scan the physical document to generate a set of page image(s). In embodiments where document(s) 110 is/are digital document files, imager 145 may convert document(s) 110 to an image format to generate a set of page image(s).

In some embodiments, the generation of a set of page image(s) by imager 145 may include binarization and/or morphological dilation techniques, as described herein. For example, binarization techniques may result in a set of grayscale page image(s), and morphological dilation techniques may result in block of connected characters. These character blocks may be blocked according to paragraphs, sentences, words, letter characters, etc. In some embodiments, binarization and morphological dilation may be performed by another component, such as image feature extractor 147.

In some embodiments, image feature extractor 147 may employ a neural network to extract features of page image(s) and/or character blocks using SIFT techniques, as described herein. For example, SIFT techniques may include edge detection, corner detection, blob detection, ridge detection, image gradient analysis, keypoint localization, keypoint description, orientation assignment, etc. The product of executing a SIFT algorithm on a page image or character block may include, for example, a set of character block features. In some embodiments, character block features may be embodied as block vectors. Block vectors may be a mathematical expression or array of values representing the features extracted from the page image and/or character blocks.

Features extracted from document(s) 110 by image feature extractor 147 may be stored to generate document feature repository 150. As described herein, the features may be stored as page image features, character block features, block vectors, etc. In some embodiments, digital copies of the document(s) 110 and/or page image(s) may also be stored in document feature repository 150. As described herein, document feature repository 150 may store document(s) 110, page image(s), and/or features (e.g., page image features, character block features, block vectors, etc.) in any suitable database, such as a relational database, table, text index, etc.

Query pre-processor 130 may include query variation generator 135 and text to image converter 137. Query variation generator 135 may receive query 105 from client device 170. In some embodiments, query 105 may be sent in response to a send command initiated by a user, or query 105 may be sent with a set of queries in batch style so that query variation generator 135 may process multiple queries in parallel (e.g., using Singe Instruction Multiple Data techniques).

In some embodiments, query variation generator 135 may generate variable document search queries from query 105. Variable document search queries may be generated by modifying one or more subcomponents (e.g., words/characters/etc.) of query 105 to arrive at a similar, yet different, query (e.g., a variable document search query), as described herein. As variable document search queries are generated (or, alternatively, once a threshold number of variable document search queries have been generated), the variable document search queries may be sent to text to image converter 137.

Text to image converter 137 may generate, as described herein, images of variable document search queries. In some embodiments, images of variable document search queries may correspond to page images or character block images (which may further be classified into paragraph images, sentence images, word images, character images, etc.). Images of the variable document search queries may then be sent to image feature extractor 147, where features are extracted, as described herein. In this way, searcher 160 may be provided with features (e.g., page image features, character block features, block vectors, etc.).

Searcher 160 may utilize the features extracted from the images of the variable document search queries to search document feature repository 150. As described herein, searcher 160 may employ FLANN techniques and/or neural networks to generate weighted match scores between the features extracted from the images of the variable document search queries and the features extracted from the document(s) 110.

In some embodiments, searcher 160 may rank the search results according to a composite or super-composite match score and present the document(s) 110 and/or page image(s) associated with the ranked match scores (e.g., ranked search results) to a user.

Figure 2:
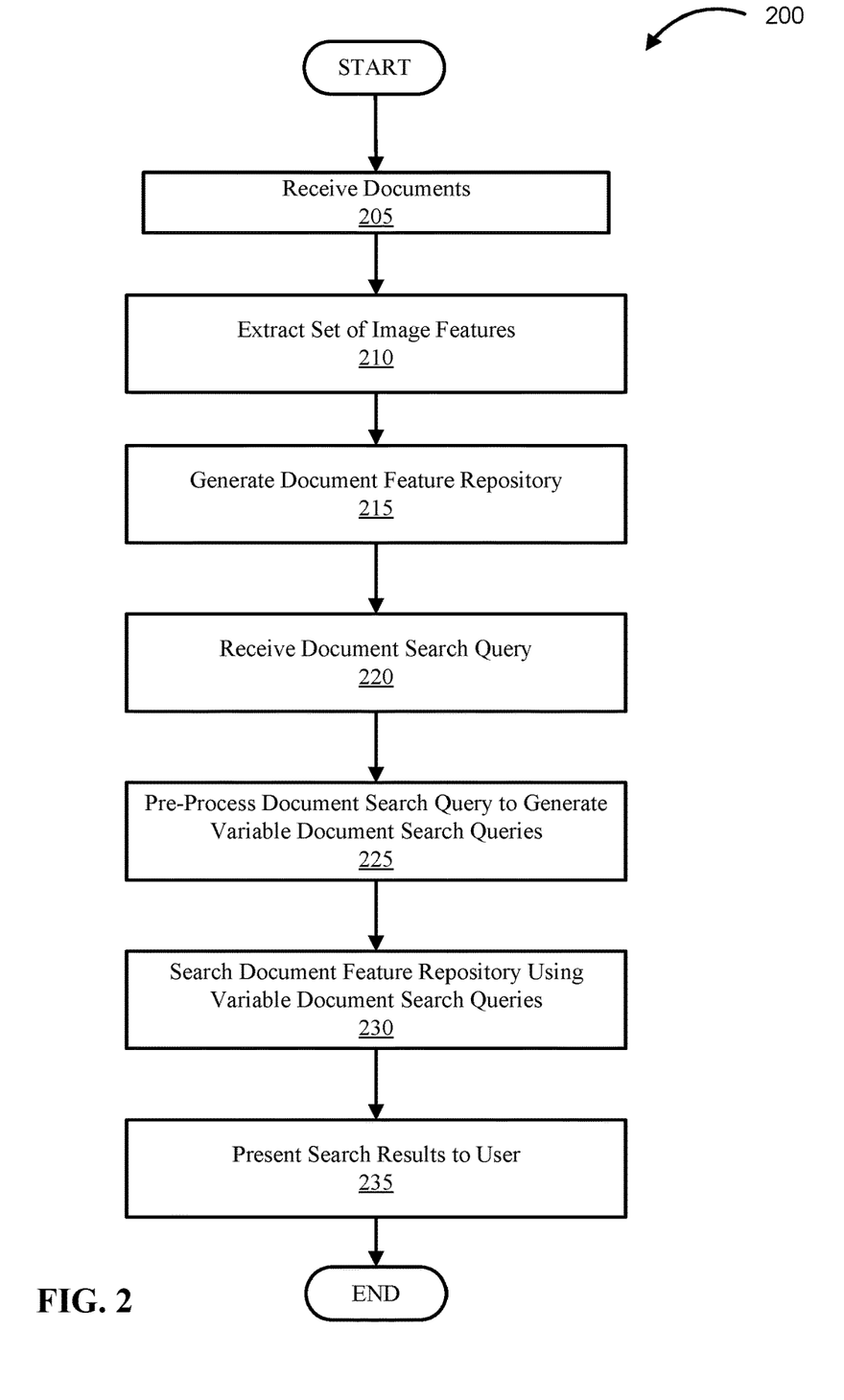
FIG. 2 illustrates a flowchart of a method for generating and searching a document feature repository, in accordance with embodiments of the present disclosure.

Referring now to FIG. 2, illustrated is a flowchart of a method 200 for generating and searching a document feature repository, in accordance with embodiments of the present disclosure. Method 200 may begin at 205, where documents are received, as described herein.

At 210, a set of image features are extracted from the documents. As described herein, image features may include page image features, character block features, block vectors, etc. 210 may include subprocesses, such as method 300 which is described in greater detail in regard to FIG. 3.

At 215, a document feature repository is generated. The document feature repository may be generated by storing extracted features (and, in some embodiments, the documents themselves) in a database or other suitable data structure, as described herein.

At 220, a document search query is received. A document search query may include a search string generated by a user. In some embodiments, the document search query may be typed input into a computing device. In some embodiments, a document search query could be a portion of a scanned document or image, which may then be converted into a textual search string. For example, a user may scan a handwritten sentence into an image and submit it as a document search query to find a document containing the sentence.

At 225, the document search query is pre-processed to generate variable document search queries, as described herein. Variable document search queries may include the same number of words, or in some embodiments, the number of words may be modified. For example, a search for "blue cinderblock" may be modified to "light blue cinderblock," or "baby blue cinderblock." In embodiments, 225 may include subprocesses, such as method 400 of FIG. 4.

At 230, the document feature repository is searched using the variable document search queries, as described herein. In some embodiments, FLANN techniques may be employed to determine which features within the repository most closely match the original query and/or the variable document queries. In embodiments, 230 may include subprocesses, such as method 500 of FIG. 5.

At 235, the search results are presented to the user. In some embodiments, the search results may return the single best matching document, or the search results may return a list of ranked search results, as described herein.

While method 200 presents a series of operations in a particular order, it should be recognized that some operations may be performed in an alternative order while still falling within the scope and intent of this specification. For example, 220 and 225 may be performed prior to, or concurrently with, operations 205-215. The order of operations depicted should not be construed as limiting in any sense.

Figure 3:
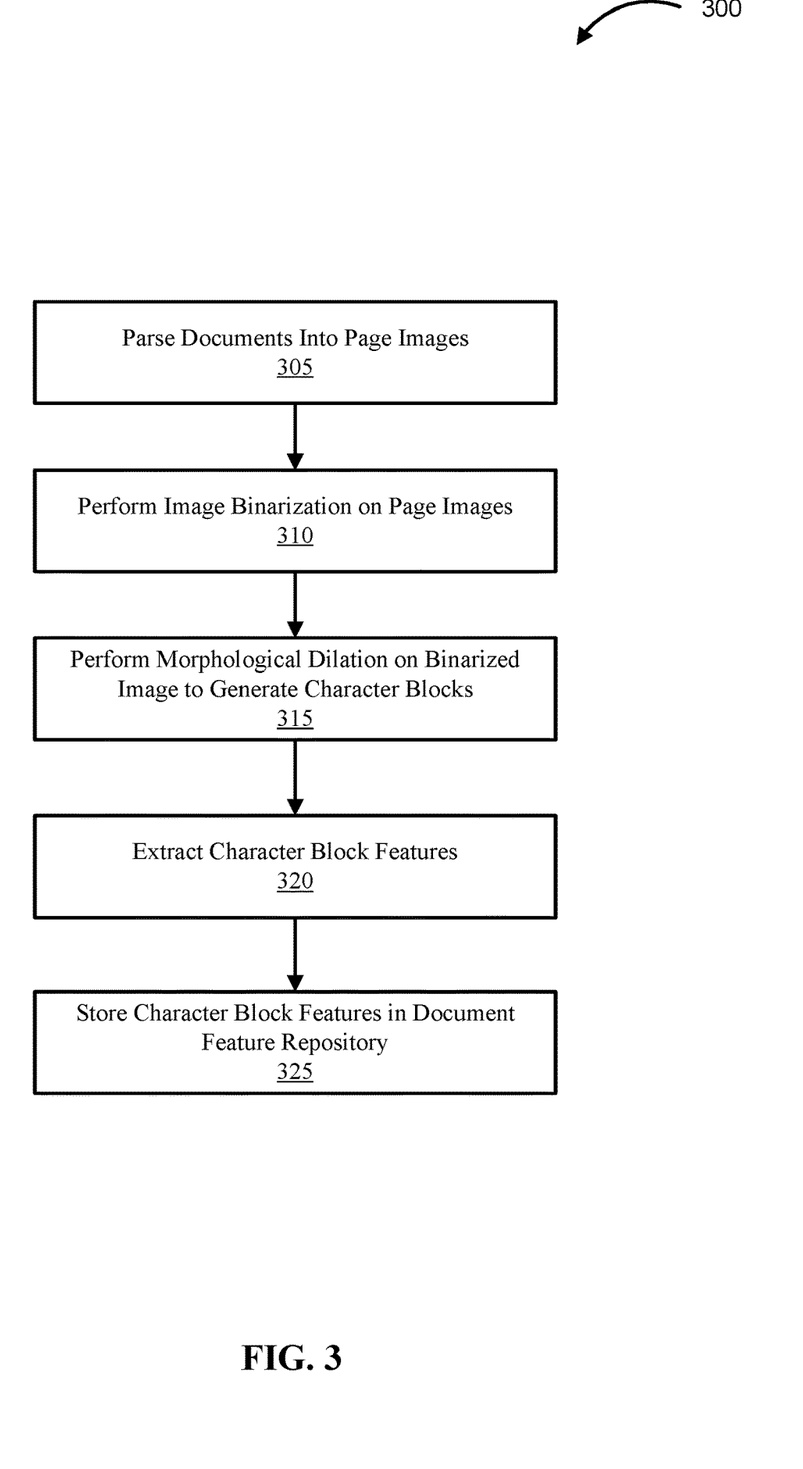
FIG. 3 illustrates a flowchart of a method for extracting a set of image features, in accordance with embodiments of the present disclosure.

Referring now to FIG. 3, illustrated is a flowchart of a method 300 for extracting a set of image features, in accordance with embodiments of the present disclosure. In embodiments, method 300 may be a subprocess of 210 of FIG. 2. Method 300 may begin at 305 where documents are parsed into page images. For example, a document may be converted into an image format and parsed into images representing each page of the document (e.g., page images).

At 310, image binarization is performed on the page images, as described herein. Image binarization techniques may include converting the image into a grayscale format. In some embodiments, a grayscale format may be a monochromatic scale in any color.

At 315, morphological dilation techniques are performed on the binarized image(s) to generate character blocks, as described herein. Character blocks may be groups/blocks of related text and/or embedded images within the page image. According to embodiments, character blocks may embody pages, paragraphs, sentences, words, and/or characters. In some embodiments, characters may include roman or Cyrillic-style letter characters, or it may refer to syllabic or word-style characters, such as those used in Chinese, Korean, Japanese, etc.

At 320, character block features are extracted. In some embodiments, a SIFT algorithm may be used to extract the character block features and generate block vectors, as described herein.

At 325, the character block features are stores in a document feature repository, as described herein. In some embodiments, the document feature repository may be available to the public or a select group of users may "pool" their respective character block features to build a robust document feature repository.

Figure 4:
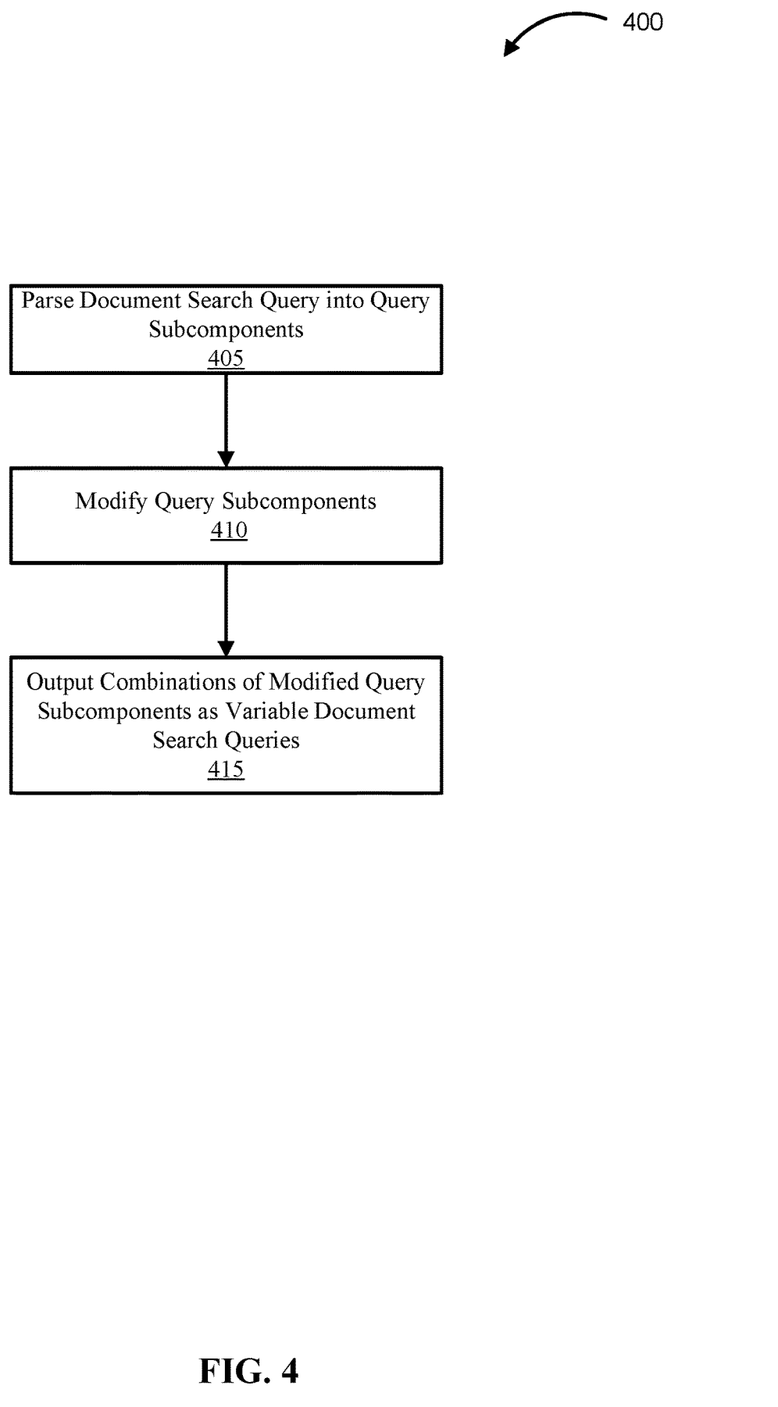
FIG. 4 illustrates a flowchart of a method for pre-processing a document search query, in accordance with embodiments of the present disclosure.

Referring now to FIG. 4, illustrated is a flowchart of a method 400 for pre-processing a document search query, in accordance with embodiments of the present disclosure. In some embodiments, method 400 may be a subprocess of 225 of FIG. 2. Method 400 may begin at 405, where a document search query (e.g., a "query") may be parsed into query subcomponents, as described herein.

At 410, the query subcomponents are modified, as described herein. In some embodiments, for example, subcomponent modifications may include swapping out words within a phrase (e.g., swapping "rock" for "stone"), changing the number of words and/or word endings (e.g., "I went for a run" may become "I went running"), etc.

At 415, combinations of the modified query subcomponents are output as variable document search queries, as described herein. For example, an original query "I went for a run" may be modified and a set of variable document search queries may be output—the example set may include: "I went running," "I went on a run," "I went for a jog," "I went hiking," "I left to go running," "We went for a run," etc.

Figure 5:
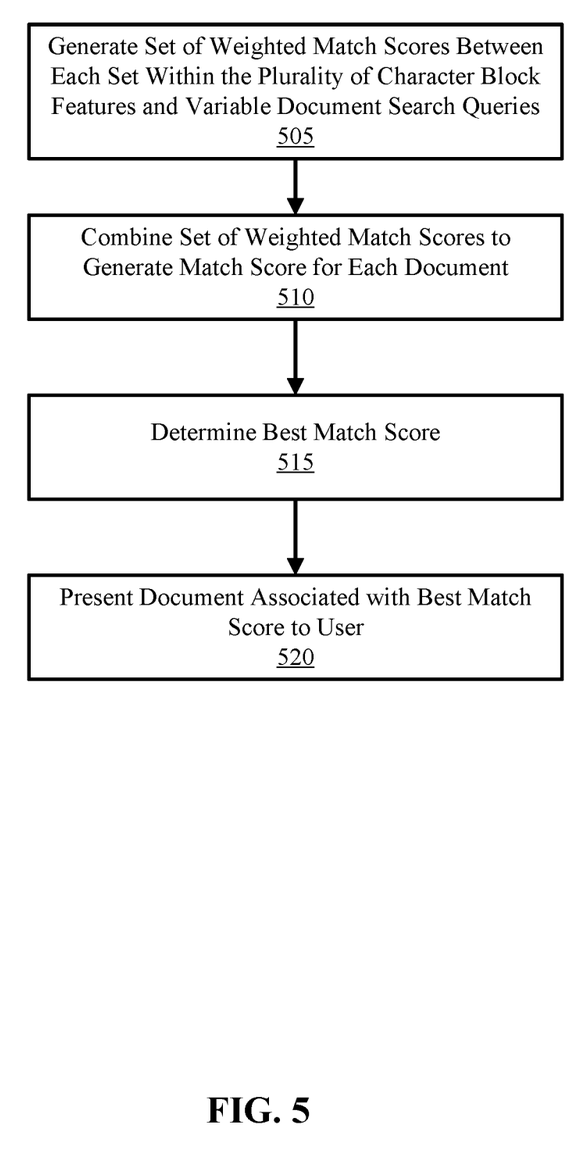
FIG. 5 illustrates a flowchart of a method for searching a document feature repository using a set of variable document search queries, in accordance with embodiments of the present disclosure.

Referring now to FIG. 5, illustrated is a flowchart of a method 500 for searching a document feature repository using a set of variable document search queries, in accordance with embodiments of the present disclosure. In embodiments, method 500 may be a subprocess of 230 of FIG. 2. Method 500 may begin at 505, where a set of weighted match scores between each set within the plurality of character block features and the variable document search queries is generated, as described herein. In some embodiments, a single weighted match score represents the relationship/match between a single character block feature and a single variable document search query (where the variable document search queries may also include the original query).

At 510, the set of weighted match scores associated with a single document may be combined to generate the match score for each document. In some embodiments, the match score for each document may be a composite match score or a super-composite match score, as described herein. In some embodiments, generating a match score for a document may entail generating a match score between the features in a document feature repository and a variable document search query, and associating that match score with the document from which the features were extracted.

At 515, the best match score is determined. Determining a best match score may include adjusting the weighted match score values according to a user input. For example, a user may desire to rank the search results according to the match scores obtained using character blocks at the sentence level. To facilitate this, the weighted match score associated with the sentence level character block may be increase, or other scores may be decreased. In this way, the match scores may be adjusted according to what the user deems is "best" and ranked, accordingly.

At 520, the document associated with the best match score is presented to the user, as described herein. In some embodiments, multiple documents may be presented to the user. For example, a set of documents with the five best match scores may all be presented to the user, and the user may select whichever document(s) he/she believes is best. In such embodiments, the user selection may be used as feedback to adjust or "train" a neural network.

Figure 6:
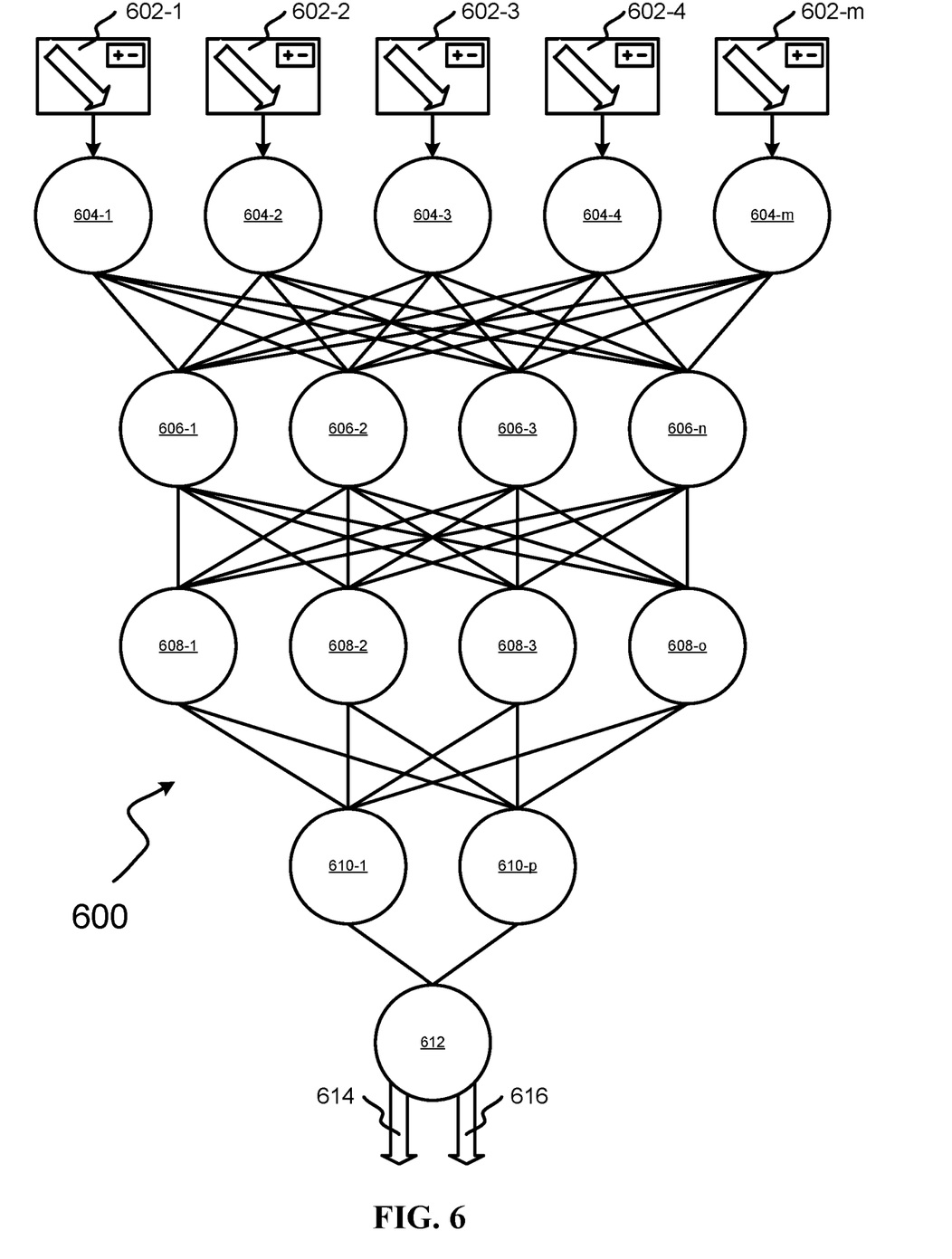
FIG. 6 illustrates an example neural network that may be specialized to extract features or generate weighted match scores, in accordance with embodiments of the present disclosure.

FIG. 6 depicts an example neural network 600 that may be specialized to extract features or generate weighted match scores, in accordance with embodiments of the present disclosure. Inputs may include, for example, page images or features for comparison/matching, as described herein. In embodiments, neural network 600 may be a classifier-type neural network. Neural network 600 may be part of a larger neural network. For example, neural network 600 may be nested within a single, larger neural network, connected to several other neural networks, or connected to several other neural networks as part of an overall aggregate neural network.

Inputs 602-1 through 602-$m$ represent the inputs to neural network 600. In this embodiment, 602-1 through 602-$m$ do not represent different inputs. Rather, 602-1 through 602-$m$ represent the same input that is sent to each first-layer neuron (neurons 604-1 through 604-$m$) in neural network 600. In some embodiments, the number of inputs 602-1 through 602-$m$ (i.e., the number represented by m) may equal (and thus be determined by) the number of first-layer neurons in the network. In other embodiments, neural network 600 may incorporate 1 or more bias neurons in the first layer, in which case the number of inputs 602-1 through 602-$m$ may equal the number of first-layer neurons in the network minus the number of first-layer bias neurons. In some embodiments, a single input (e.g., input 602-1) may be input into the neural network. In such an embodiment, the first layer of the neural network may comprise a single neuron, which may propagate the input to the second layer of neurons.

Inputs 602-1 through 602-$m$ may comprise one or more samples of classifiable data. For example, inputs 602-1 through 602-$m$ may comprise 10 samples of classifiable data. In other embodiments, not all samples of classifiable data may be input into neural network 600.

Neural network 600 may comprise 5 layers of neurons (referred to as layers 604, 606, 608, 610, and 612, respectively corresponding to illustrated nodes 604-1 to 604-$m$, nodes 606-1 to 606-$n$, nodes 608-1 to 608-$o$, nodes 610-1 to 610-$p$, and node 612). In some embodiments, neural network 600 may have more than 5 layers or fewer than 5 layers. These 5 layers may each be comprised of the same number of neurons as any other layer, more neurons than any other layer, fewer neurons than any other layer, or more neurons than some layers and fewer neurons than other layers. In this embodiment, layer 612 is treated as the output layer. Layer 612 outputs a probability that a target event will occur and contains only one neuron (neuron 612). In other embodiments, layer 612 may contain more than 1 neuron. In this illustration no bias neurons are shown in neural network 600. However, in some embodiments each layer in neural network 600 may contain one or more bias neurons.

Layers 604-612 may each comprise an activation function. The activation function utilized may be, for example, a rectified linear unit (ReLU) function, a SoftPlus function, a Soft step function, a SIFT algorithm, or others. Each layer may use the same activation function, but may also transform the input or output of the layer independently of or dependent upon the activation function. For example, layer 604 may be a "dropout" layer, which may process the input of the previous layer (here, the inputs) with some neurons removed from processing. This may help to average the data, and can prevent overspecialization of a neural network to one set of data or several sets of similar data. Dropout layers may also help to prepare the data for "dense" layers. Layer 606, for example, may be a dense layer. In this example, the dense layer may process and reduce the dimensions of the feature vector (e.g., the vector portion of inputs 602-1 through 602-$m$) to eliminate data that is not contributing to the prediction. As a further example, layer 608 may be a "batch normalization" layer. Batch normalization may be used to normalize the outputs of the batch-normalization layer to accelerate learning in the neural network. Layer 610 may be any of a dropout, hidden, or batch-normalization layer. Note that these layers are examples. In other embodiments, any of layers 604 through 610 may be any of dropout, hidden, or batch-normalization layers. This is also true in embodiments with more layers than are illustrated here, or fewer layers.

Layer 612 is the output layer. In this embodiment, neuron 612 produces outputs 614 and 616. Outputs 614 and 616 represent complementary probabilities that a target event will or will not occur. For example, output 614 may represent the probability that a target event will occur, and output 616 may represent the probability that a target event will not occur. In some embodiments, outputs 614 and 616 may each be between 0.0 and 1.0, and may add up to 1.0. In such embodiments, a probability of 1.0 may represent a projected absolute certainty (e.g., if output 614 were 1.0, the projected chance that the target event would occur would be 100%, whereas if output 416 were 1.0, the projected chance that the target event would not occur would be 100%).

In embodiments, FIG. 6 illustrates an example probability-generator neural network with one pattern-recognizer pathway (e.g., a pathway of neurons that processes one set of inputs and analyzes those inputs based on recognized patterns, and produces one set of outputs). However, some embodiments may incorporate a probability-generator neural network that may comprise multiple pattern-recognizer pathways and multiple sets of inputs. In some of these embodiments, the multiple pattern-recognizer pathways may be separate throughout the first several layers of neurons, but may merge with another pattern-recognizer pathway after several layers. In such embodiments, the multiple inputs may merge as well (e.g., several smaller vectors may merge to create one vector). This merger may increase the ability to identify correlations in the patterns identified among different inputs, as well as eliminate data that does not appear to be relevant.

In embodiments, neural network 600 may be trained/adjusted (e.g., biases and weights among nodes may be calibrated) by inputting feedback (e.g., image features or match scores, respectively) and/or input from a user to correct/force the neural network to arrive at an expected output. In embodiments, the impact of the feedback on the weights and biases may lessen over time, in order to correct for inconsistencies among user(s) and/or datasets. In embodiments, the degradation of the impact may be implemented using a half-life (e.g., the impact degrades by 50% for every time interval of X that has passed) or similar model (e.g., a quarter-life, three-quarter-life, etc.).

Figure 7:
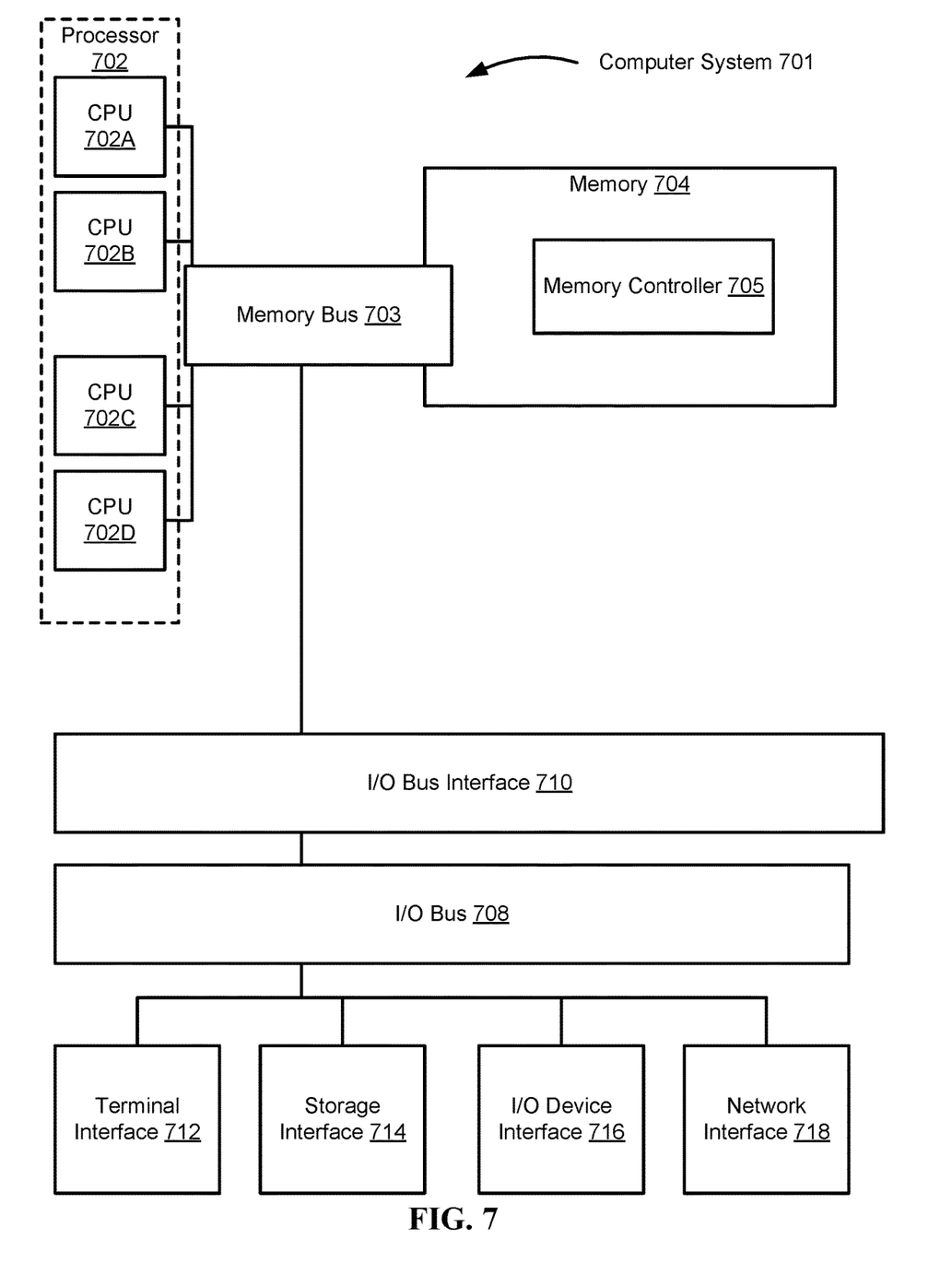
FIG. 7 illustrates a high-level block diagram of an example computer system that may be used in implementing embodiments of the present disclosure.

Referring now to FIG. 7, shown is a high-level block diagram of an example computer system 701 that may be configured to perform various aspects of the present disclosure, including, for example, methods 200/300/400/500, described in FIGS. 2, 3, 4, and 5, respectively. The example computer system 701 may be used in implementing one or more of the methods or modules, and any related functions or operations, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may comprise one or more levels of on-board cache.

In some embodiments, the memory subsystem 704 may comprise a random-access semiconductor memory, storage device, or storage medium (either volatile or non-volatile) for storing data and programs. In some embodiments, the memory subsystem 704 may represent the entire virtual memory of the computer system 701, and may also include the virtual memory of other computer systems coupled to the computer system 701 or connected via a network. The memory subsystem 704 may be conceptually a single monolithic entity, but, in some embodiments, the memory subsystem 704 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 704 may contain elements for control and flow of memory used by the CPU 702. This may include a memory controller 705.

Although the memory bus 703 is shown in FIG. 7 as a single bus structure providing a direct communication path among the CPUs 702, the memory subsystem 704, and the I/O bus interface 710, the memory bus 703 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, mobile device, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating and searching a document feature repository, the method comprising:
   receiving a plurality of documents;
   extracting a set of image features from one or more documents within the plurality of documents, wherein extracting the set of image features comprises:
      parsing the one or more documents into a set of page images, by document;
      generating one or more sets of character blocks for each page image within the set of page images;
      extracting a plurality of character block features for each character block;
   generating the document feature repository by storing the one or more sets of image features, by document;
   receiving a document search query; pre-processing the document search query to generate a set of variable document search queries;
   searching the document feature repository using the set of variable document search queries wherein searching the document feature repository using the set of variable document search queries further comprises generating a set of match scores between each set within the plurality of character block features and the set of variable document search queries, wherein generating a set of match scores between the one or more documents and the set of variable document search queries further comprises:
      generating, using Fast Library for Approximate Nearest Neighbors (FLANN), a set of weighted match scores between the plurality of character block features for each of the one or more documents and the set of variable document search queries; and
      combining the set of weighted match scores to generate the match score for each of the one or more documents; and
   presenting the search results to a user.
2. The method of claim 1, wherein extracting the set of image features further comprises:
   storing the plurality of character block features in the document feature repository, by page image.
3. The method of claim 2, wherein generating one or more sets of character blocks further comprises:
   performing image binarization on the document; and
   performing morphological dilation on the binarized document to generate the one or more sets of character blocks.
4. The method of claim 1, wherein pre-processing the document search query further comprises:
   parsing the document search query into a set of query subcomponents;
   modifying the set of query subcomponents by replacing a first query subcomponent with a second query subcomponent, wherein the first and second query subcomponents are similar; and
   outputting the modified set of query subcomponents as a first variable document search query within the set of variable document search queries.
5. The method of claim 2, wherein the plurality of character block features includes a set of character features, a set of word features, and a set of sentence features.
6. The method of claim 5, wherein searching the document feature repository using the set of variable document search queries further comprises:
   determining a best match, according to the set of match scores; and
   presenting the document associated with the best match score to the user.
7. The method of claim 1, wherein generating the set of weighted match scores includes adjusting a weight and a bias of one or more neural network edges.
8. A computer program product for generating and searching a document feature repository, the computer program product comprising a computer readable storage medium having program instructions embodied therewith, the program instructions executable by a device to cause the device to:
   receive a plurality of documents;
   extract a set of image features from one or more documents within the plurality of documents, wherein extracting the set of image features comprises:
      parsing the one or more documents into a set of page images, by document;
      generating one or more sets of character blocks for each page image within the set of page images;
      extracting a plurality of character block features for each character block;
   generate the document feature repository by storing the one or more sets of image features, by document;
   receive a document search query;
   pre-process the document search query to generate a set of variable document search queries;
   search the document feature repository using the set of variable document search queries, wherein searching the document feature repository using the set of variable document search queries further comprises generating a set of match scores between each set within the plurality of character block features and the set of variable document search queries, wherein generating a set of match scores between the one or more documents and the set of variable document search queries further comprises:
      generating, using Fast Library for Approximate Nearest Neighbors (FLANN), a set of weighted match scores between the plurality of character block features for each of the one or more documents and the set of variable document search queries; and combining the set of weighted match scores to generate the match score for each of the one or more documents; and present the search results to a user.

9. The computer program product of claim 8, wherein extracting the set of image features further comprises:

storing the plurality of character block features in the document feature repository, by page image.

10. The computer program product of claim 9, wherein generating one or more sets of character blocks further comprises:

performing image binarization on the document; and performing morphological dilation on the binarized document to generate the one or more sets of character blocks.

11. The computer program product of claim 8, wherein pre-processing the document search query further comprises:

parsing the document search query into a set of query subcomponents;

modifying the set of query subcomponents by replacing a first query subcomponent with a second query subcomponent, wherein the first and second query subcomponents are similar; and outputting the modified set of query subcomponents as a first variable document search query within the set of variable document search queries.

12. The computer program product of claim 9, wherein the plurality of character block features includes a set of character features, a set of word features, and a set of sentence features.

13. The computer program product of claim 12, wherein searching the document feature repository using the set of variable document search queries further comprises:

determining a best match, according to the set of match scores; and presenting the document associated with the best match score to the user.

14. A system for generating and searching a document feature repository, comprising:

a memory with program instructions included thereon; and a processor in communication with the memory, wherein the program instructions cause the processor to:

receive a plurality of documents;

extract a set of image features from one or more documents within the plurality of documents, wherein extracting the set of image features comprises:

parsing the one or more documents into a set of page images, by document generating one or more sets of character blocks for each page image within the set of page images;

extracting a plurality of character block features for each character block;

generate the document feature repository by storing the one or more sets of image features, by document;

receive a document search query;

pre-process the document search query to generate a set of variable document search queries;

search the document feature repository using the set of variable document search queries, wherein searching the document feature repository using the set of variable document search queries further comprises generating a set of match scores between each set within the plurality of character block features and the set of variable document search queries, wherein generating a set of match scores between the one or more documents and the set of variable document search queries further comprises:

generating, using Fast Library for Approximate Nearest Neighbors (FLANN), a set of weighted match scores between the plurality of character block features for each of the one or more documents and the set of variable document search queries; and combining the set of weighted match scores to generate the match score for each of the one or more documents; and present the search results to a user.

15. The system of claim 14, wherein extracting the set of image features comprises:

parsing the one or more documents into a set of page images, by document;

generating one or more sets of character blocks for each page image within the set of page images;

extracting a plurality of character block features for each character block; and storing the plurality of character block features in the document feature repository, by page image.

16. The system of claim 15, wherein generating one or more sets of character blocks further comprises:

performing image binarization on the document; and performing morphological dilation on the binarized document to generate the one or more sets of character blocks.

17. The system of claim 14, wherein pre-processing the document search query further comprises:

parsing the document search query into a set of query subcomponents;

modifying the set of query subcomponents by replacing a first query subcomponent with a second query subcomponent, wherein the first and second query subcomponents are similar; and outputting the modified set of query subcomponents as a first variable document search query within the set of variable document search queries.

18. The system of claim 15, wherein the plurality of character block features includes a set of character features, a set of word features, and a set of sentence features.

19. The system of claim 15, wherein extracting the set of image features further comprises:

storing the plurality of character block features in the document feature repository, by page image.

20. The system of claim 15, wherein searching the document feature repository using the set of variable document search queries further comprises:

determining a best match, according to the set of match scores; and presenting the document associated with the best match score to the user.

* * * * *